United States Patent Office 3,424,717
Patented Jan. 28, 1969

3,424,717
STABILIZED VINYL RESINS
Joel B. Gottlieb, Metuchen, and William E. Mayo, South River, N.J., assignors to M & T Chemicals Inc., New York, N.Y., a corporation of Delaware
No Drawing. Filed Mar. 2, 1966, Filed 531,805
U.S. Cl. 260—45.75                                   9 Claims
Int. Cl. C08f 45/62, 45/58

ABSTRACT OF THE DISCLOSURE

In accordance with certain of its aspects, the process of this invention for preparing a novel halogen-containing polymer stabilized against the deteriorative effect of heat comprises adding to a halogen-containing resin a stabilizing amount of: a first stabilizer having the formula $(RSnX_{1.5})_n$ wherein R is selected from the group consisting of alkyl having 1 to 20 carbon atoms, aryl, alkaryl, aralkyl, and cycloalkyl, and X is selected from the group consisting of oxygen and sulfur and mixtures of 1–10 parts of oxygen with 10–1 parts of sulfur and $n$ is an integer 1–1000; a second stabilizer having the formula

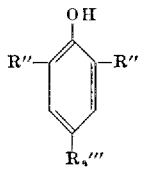

wherein R″ is a branched alkyl containing less than about 10 carbon atoms, R‴ is an alkyl containing less than about 10 carbon atoms, and $a$ is a number 0–1; and a third stabilizer $R'_aSn(SR'')_{4-a}$ wherein R′ may be a hydrocarbon radical selected from the group consisting of alkyl, cycloalkyl, aralkyl, alkaryl, and aryl, R″ may be a residue of a carboxylic acid, a residue of a carboxylic acid ester, or a radical selected from the same group as R′ and $a$ is an integer 1–3.

---

This invention relates to a method for stabilizing halogen-containing polymers including polyvinyl chloride and to novel stabilization halogen-containing polymer compositions.

As is well known to those skilled-in-the-art, various halogen-containing organic polymers, particularly vinyl halide polymers which include homopolymers of vinyl chloride and copolymers of vinyl chloride with other monomers, may degrade when subjected to heat over an extended period of time as evidenced by darkening of the resin and by an increase in brittleness. These defects may render the resin unsuitable for many uses since the darkening produces an unsightly appearance, and the increased brittleness may cause mechanical failures. A wide variety of materials has heretofore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

It is particularly characteristic of prior art stabilizing systems that they may not fully prevent the deterioration of resins or polymers including polyvinyl chloride during the period when the resins and stabilizer composition may be maintained on the hot mill on which they are blended. During this period, which may be from 5 to 30 minutes or longer, the various ingredients including e.g. pigment, plasticizer, stabilizer, lubricant, etc. may be mixed with the resin and the mixture subjected to the influence of heat and pressure to form a substantially homogeneous mixture. During this period of severe heating (typically at 175° C. or higher), the resin may deteriorate much more quickly than under normal processing or handling conditions. Thus the product coming from the Banbury Mill-Blender or extruder may be darker than is desirable.

Those skilled-in-the-art have heretofore attempted to eliminate this deterioration resulting from heat by addition of various materials including auxiliary heat stabilizers. It has been found however that the presence of these additional materials results in undesirable side effects which may unsatisfactorily modify the desired properties of the resin or polymer. Accordingly it has heretofore not been possible to prepare resin compositions which may be stabilized in totally satisfactory manner against the deteriorative effect of heat.

It is an object of this invention to provide a method for stabilizing halogen-containing organic polymer or resin compositions, particularly vinyl halide polymers, against heat deterioration. It is a further object of this invention to provide novel stabilized halogen-containing polymers. Other objects will be apparent to those skilled-in-the-art from inspection of the following description.

In accordance with certain of its aspects, the process of this invention for preparing a novel halogen-containing polymer stabilized against the deteriorative effect of heat comprises adding to a halogen-containing resin a stabilizing amount of: a first stabilizer having the formula $(RSnX_{1.5})_n$ wherein R is selected from the group consisting of alkyl having 1 to 20 carbon atoms, aryl, alkaryl, aralkyl, and cycloalkyl, and X is selected from the group consisting of oxygen and sulfur and mixtures of 1–10 parts of oxygen with 10–1 parts of sulfur and $n$ is an integer 2–1000; a second stabilizer having the formula

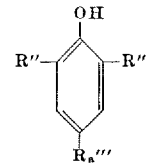

wherein R″ is a branched alkyl containing less than about 10 carbon atoms, R‴ is an alkyl containing less than about 10 carbon atoms, and $a$ is a number 0–1; and a third stabilizer $R'_aSn(SR'')_{4-a}$ wherein R′ may be a hydrocarbon radical selected from the group consisting of alkyl, cycloalkyl, aralkyl, alkaryl, and aryl, R″ may be a residue of a carboxylic acid, a residue of a carboxylic acid ester, or a radical selected from the same group as R′ and $a$ is an integer 1–3.

The polymers or resins which may be stabilized by practice of this invention may be halogen-containing organic polymers typically those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will be hereinafter made to vinyl chloride polymers.

The polymers may be either "rigid" or "flexible." When "rigid" polymers are employed, they may include impact modifiers, pigments and/or fillers, lubricants etc., in addition to the resin and stabilizer. When "flexible" polymers are employed, they may include plasticizer (primary and secondary), pigments and/or fillers, lubricants, etc. in addition to the resin and stabilizer.

The vinyl chloride polymers may also contain plasticizers such as dioctyl phthalate; lubricating agents such as stearic acid; pigments; fillers, etc.

The first stabilizer which may find use in certain aspects of this invention may have the formation $$(RSnX_{1.5})_n$$

In this compound, R may be a hydrocarbon radical preferably selected from the group consisting of alkyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e., having less than about 8 carbon atoms i.e. octyls and lower. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typcally be phenyl, naphthyl, etc. When R is alkaryl, it may typically be tolyl, xylyl, p-ethylphenyl, p-nonylphenyl, etc. R may be inertly substituted e.g. may bear a non-reactive substituent such as alkyl, aryl, cycloalkyl, aralkyl, alkaryl, ether, etc. Typical substituted alkyls include 2-ethoxyethyl, etc. Substituted cycloalkyls include 4-methylcyclohexyl, etc. Inertly substituted aryl includes anisyl, biphenyl, etc. Inertly substituted aralkyl includes chlorobenzyl, p-phenylbenzyl, p-methylbenzyl, etc. Inertly substituted alkaryl includes 2,6-di-tert-butyl-4-methylphenyl, etc.

The first stabilizer which may find use in certain aspects of this invention may be a thiostannonic acid or a stannonic acid viz: alkyl thiostannonic acid (also referred to as alkyl thiostannoic acid), aryl thiostannoic acid, cycloalkyl thiostannoic acid, aralkyl thiostannoic acid, alkaryl thiostannoic acid, etc.; and similarly for the stannonic (i.e. stannoic) acids. For convenience, the term *stannoic* will be employed rather than the term thiostannonic.

Polymeric stannoic acids and thiostannoic acids may include the condensation products of stannoic acid and thiostannoic acid respectively, the products having degrees of condensation of 2 to about 1,000 and preferably 2–100.

These compounds may be represented by the formula:

$$(RSnX_{1.5})_n \quad (I)$$

where X is oxygen, sulfur, and mixtures of 1–10 parts of oxygen with 10–1 parts of sulfur i.e. mixtures containing these elements in a weight proportion between 1:10 and 10:1; and n may be 2–1000, preferably 2–100.

Polymeric stannoic acids may correspond to Formula II infra and polymeric thiostannoic acids may correspond to Formua III infra. In the co-condensation products, units of e.g. stannoic acid may alternate with units of e.g. thiostannoic acid in accordance with Formula IV given below in which case m and n may each be 2–1000, preferably 2–100.

$$(RSnO_{1.5})_n \quad (II)$$
$$(RSnS_{1.5})_n \quad (III)$$
$$(RSnO_{1.5})_m(RSnS_{1.5})_n \quad (IV)$$

The R group of the polymeric stannoic acids or thiostannoic acids may preferably include alkyl groups which contain 1–20 carbon atoms and preferably 4 carbon atoms. Other stannoic acids including polymeric aryl stannoic acids and cycloalkylstannoic acids and aryl-thiostannoic acid and cycloalkyl-thiostannoic acids may be effective; but the alkyl compounds may be preferred.

The above compositions may be prepared for example by the reaction of $RSnCl_3$, typically butyltin trichloride with alkaline hydrolyzing agents such as ammonia, sodium hydroxide, etc. to yield e.g. $(RSnO_{1.5})_n$ or with e.g. sodium sulfide $Na_2S$ to yield e.g. $(RSnS_{1.5})_n$ wherein $n$ may be as defined supra. If $RSnCl_3$ be reacted e.g. in aqueous medium with less than equivalent amount of sulfide, the product may be $(RSnO_{1.5})_m(RSnS_{1.5})_n$ containing both oxygen and sulfur.

The preferred compounds may be those having the formula $(RSnS_{1.5})_n$ wherein the R group is a lower alkyl group, and most preferably butyl. Preferably also the compounds employed may be those wherein $n$ may be about 2–100.

Preferred first stabilizers may typically include methyl thiostannoic acid $(CH_3SnS_{1.5})_n$ wherein $n$ may be 2–1000; butyl thiostannoic acid $(C_4H_9SnS_{1.5})_n$ wherein $n$ may be 2–1000; n-octyl thiostannoic acid $(n-C_8H_{17}SnS_{1.5})_n$ wherein $n$ may be 2–1000.

The second stabilizer which may find use in the practice of this invention may be a compound of the formula

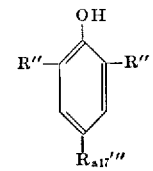

wherein R″ is a branched alkyl radical containing less than about 10 carbon atoms. R″ may be, for example, isopropyl, tert-butyl, sec-butyl, isobutyl, sec-amyl, tert-amyl, isoamyl, and corresponding branched hexyl radicals, heptyl radicals, octyl radicals, nonyl radicals, etc. Preferably both of the R″ radicals may be the same. Preferred R″ radicals may be branched alkyl radicals containing 3–5 carbon atoms, e.g. branched propyl, butyl, and amyl radicals. The tert-butyl radical may be highly preferred.

The radical R‴ may be an alkyl radical containing less than about 10 carbon atoms. The radical R‴ may be a branched chain alkyl radical which may be the same as or different from the R″ branched alkyl radicals. R‴ may also be a straight chain alkyl radical such as methyl, ethyl, n-propyl, n-butyl, n-amyl, n-hexyl, n-heptyl, n-octyl, n-nonyl, etc. Preferably R‴ may be alkyl containing 1–4 carbon atoms, e.g. methyl, ethyl, propyl, and butyl. $a$ may be 0–1.

Typical second stabilizers which fall within the above description include:

2,6-di-tert-amyl-p-cresol
2,6-di-tert-butyl-p-cresol
2,6-di-isopropyl-4-ethylphenol
2,6-di-tert-butyl-4-nonylphenol
2,4,6-tri-tert-butylphenol
2,6-di-isoamyl-4-ethylphenol
2,6-di-tert-amyl-4-n-amylphenol
2,6-di-osobutyl-p-cresol
2,6-di-sec-butyl-4-n-propylphenol
2,6-di-tert-butylphenol
2,6-di-isopropylphenol
2,6-di-tert-amylphenol
2,6-di-isobutylphenol Preferred second stabilizers may include 2,6-di-tert-butyl-p-cresol
2,4,6-tri-isopropylphenol
2,6-di-tert-butylphenol The third stabilizer which may find use in practice of this invention may be a compound of the formula $$R'_aSn(SR'')_{4-a}$$

wherein $a$ is an integer 1, 2, or 3. In this formula R' may be a hydrocarbon radical selected from the group consisting of alkyl, cycloalkyl, aralkyl, alkaryl, and aryl. R'' may be selected from the same group as R' or it may also be a carboxylic acid residue—R''''COOH, or a residue of a carboxylic acid ester—R''''COOR'''''. In these formula R'''' and R''''' may be selected from the same group as R is selected from subject to the proviso that R'''' is bivalent because of the removal of one hydrogen atom. When R'' is a residue of a carboxylic acid, the residue may cyclicize (or polymerize-cyclicize) as typified by the compound dibutyltin-β-mercapto propionate, because of the presence of the proper number (5–8) of atoms which can cyclicize. Dibutyltin bis omega-carboxy lauryl mercaptide may be employed. Typical third stabilizers may include butyltin tris(iso-octyl mercaptoacetate) and tributyltin lauryl mercaptide. The preferred third stabilizers may be R'$_2$Sn(SR'')$_2$.

Typical preferred third stabilizers may include:

dibutyltin bis lauryl mercaptide
dibutyltin bis octyl mercaptide
dibutyltin bis benzyl mercaptide
dibutyltin bis xylyl mercaptide
dibutyltin bis cyclohexyl mercaptide
dibutyltin bis phenyl mercaptide
dioctyl bis lauryl mercaptide
dioctyl bis octyl mercaptide
dioctyl bis benzyl mercaptide
dioctyl bis xylyl mercaptide
dioctyl bis cyclohexyl mercaptide
dicyclohexyltin bis lauryl mercaptide
dimethyltin bis lauryl mercaptide
dimethyltin bis benzyl mercaptide
dimethyltin bis cyclohexyl mercaptide
dimethyltin xylyl bis mercaptide
dibutyltin bis omega-carboxyl lauryl mercaptide
dibutyltin beta-mercapto propionate
dioctyltin beta-mercapto propionate
dibutyltin bis iso-octyl mercaptoacetate
dioctyltin bis iso-octyl mercaptoacetate
dicyclohexyltin bis iso-octyl mercaptoacetate
dimethyltin bis iso-octyl mercaptoacetate
diphenyltin bis iso-octyl mercaptoacetate
dibutyltin bis lauryl mercaptoacetate
dibutyltin bis benzyl mercaptoacetate
dibutyltin bis cyclohexyl mercaptoacetate The preferred third stabilizer may be dibutyltin bis iso-octyl mercaptoacetate.

The first, second and third stabilizers may be present in stabilizing amounts. Typically the first stabilizer $$(RSnX_{1.5})_n$$

may be used in amount of 0.1–10 parts by weight of 100 parts by weight of halogen-containing, typically vinyl chloride resins. Preferably it may be used in the amount of 0.25–2, preferably 0.3 part per 100 parts of halogen-containing resin.

Typically the second stabilizer may be employed in the amount of 0.01–2 parts by weight per 100 parts by weight of halogen-containing resin. Preferably the amount used may be about 0.01–0.5, say 0.06 part per 100 parts by weight of halogen-containing resin.

Typically the third stabilizer may be present in amount of 0.01–5 parts per 100 parts by weight of halogen-containing resin. Preferably the amount used may be 0.05–3, say 0.8 part per 100 parts of halogen-containing resin.

Thus the preferred heat-stable vinyl chloride polymer compositions of this invention may comprise 100 parts by weight of a vinyl chloride polymer; a stabilizing amount, typically 0.1–10 parts of a first stabilizer having the formula $(RSnX_{1.5})_n$ wherein R is selected from the group consisting of alkyl having 1–20 carbon atoms, aryl, alkaryl, aralkyl, and cyclo-alkyl; a stabilizing amount, typically 0.01–2 parts of a second stabilizer having the formula

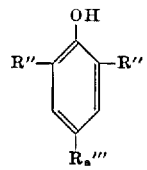

wherein R'' is a branched alkyl containing less than about 10 carbon atoms, R''' is an alkyl containing less than about 10 carbon atoms and $a$ is a number 0–1; and a third stabilizer R'$_a$Sn(SR'')$_{4-a}$ wherein R' may be a hydrocarbon radical selected from the group consisting of alkyl cycloalkyl, aralkyl, alkaryl, and aryl, R'' may be a residue of a carboxylic acid, a residue of carboxylic acid ester, or a radical selected from the same group as R' and $a$ is an integer 1–3.

The novel heat and light stable compositions of this invention may be formulated by such techniques as milling, dry blending, Banbury blending, or any other commonly employed formulating techniques.

One of the formulating methods which may be particularly convenient involves the formation of a stabilizer composition containing the first stabilizer, the second stabilizer, and the third stabilizer. This stabilizer composition may later be added to, and thoroughly mixed with the vinyl chloride polymer. Where this technique is employed, the stabilizer composition may typically comprise stabilizing amounts of the stabilizers, typically 0.1–10 parts by weight of the first stabilizer, 0.01–2 parts by weight of the second stabilizer, and 0.01–5 parts of the third stabilizer. Preferably, it may comprise about 0.25–2, say 0.3 part of the first stabilizer and about 0.1–0.5 say 0.06 part of the second stabilizer and about 0.05–3, say 0.8 part of the third stabilizer.

Whatever formulating technique be employed, it will be desirable to substantially completely and uniformly disperse the first stabilizer, the second stabilizer and the third stabilizer throughout the vinyl chloride polymer composition.

It is a feature of the novel stabilizer systems of this invention that it permits attainment of stabilized halogen-containing polymers and resins, particularly vinyl halide polymers such as vinyl chloride characterized by their resistance to the deteriorative effect of heat. The degrees of stabilization attained in such systems may be considerably in excess of that previously attainable by any prior art stabilizer system.

Because of the outstanding properties of this novel stabilizer system, it is possible to effect stabilization with lower quantities and thereby to obtain a more effective system on a cost-performance basis.

In order to point up clearly the novel features of this invention and to illustrate the unexpectedly and outstanding results which may be attained by practice of this invention, the following illustrative examples may be set forth wherein all parts are parts by weight unless otherwise indicated.

In these examples, the rigid vinyl chloride polymer employed was that having a specific gravity of 1.40, a Shore Durometer "D" hardness of 80 and an ultimate tensile strength of about 7,000 p.s.i. sold under the trademark Geon 103 EP, (or equivalent).

The illustrative first stabilizer employed was butyl thiostannoic acid having an $n$ value of 4.5. The second stabilizers employed in these illustrative tests were (a) 2,6-di-tert-butyl p-cresol, (b) 2,6-di-tert-butylphenol, and (c) 2,2'-methylene bis(4-methyl-6-tert-butylphenol). The third stabilizers employed in these examples were dibutyltin bis iso-octyl mercaptoacetate; dimethyltin bis iso-octyl mercaptoacetate; dibutyltin bis lauryl mercaptide; di-n-octyltin bis iso-octyl mercaptoacetate; dibutyltin β-mercaptopropionate.

The selected compositions were thoroughly blended by placing the polyvinyl chloride on a two-roller differential mill which was oil-heated to a temperature of 163° C.–205° C. together with the noted quantity of first, second, and third stabilizers, and the mixture was milled for about 5 minutes. A continuous band of the composition formed around one of the rollers. This band was cut and the composition was removed from the hot roller as a continuous sheet. Squares of this material measuring 2.54 cm. x 2.54 cm. were cut for heat stability testing.

For the heat stability test, the squares were placed in an air oven regulated to maintain a temperature of 190° C. Samples of each composition were removed from the oven at 15 minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color The length of time in minutes required to reach a value of 3 or less was recorded as the heat stability value.

In Example 1 as hereinafter set forth, 100 parts of the vinyl chloride polymer was tested without addition of any stabilizer and thus may serve as a control. In control Example 2, the first stabilizer butyl thiostannoic acid, having an $n$ value of 4.5, was added in amount of 1.2 parts and no other stabilizer was present. In control Example 3, the second stabilizer was 2,6-di-tert butyl p-cresol present in amount of 1.2 parts, and no other stabilizer was present. In control Example 4, the third stabilizer was dibutyltin bis iso-octyl mercaptoacetate present in amount of 1.2 parts and no other stabilizer was present. In Example 5, there were present three stabilizers as follows:

| | Parts |
|---|---|
| Butylthiostannoic acid | 0.3 |
| 2,6-di-tert butyl p-cresol | 0.1 |
| Dibutyltin bis iso-octyl mercaptoacetate | 0.8 |
| Total stabilizer | 1.2 |

The results of the heat stability tests are presented in Table I as follows:

TABLE I

| Example | Heat stability value in minutes | Color after milling |
|---|---|---|
| 1 | (¹) | 2 |
| 2 | (²) | 4 |
| 3 | 15 | 4 |
| 4 | 30 | 6 |
| 5 | 60 | 7 |

¹ No heat stability, stuck to mill after 1 minute.
² No heat stability, stuck to mill after 4 minutes.

From Table I, it will be apparent that Example 5, prepared in accordance with this invention, is outstandingly superior to the control Examples 1–4. It has a Heat Stability Value of 60 minutes which is more than twice as long as the controls. Thus the novel composition will be effective for twice as long a period of time than the best prior art control system. Furthermore, it is noted that the Color After Milling is 7 which is superior to that of the controls which are 2, 4, 4, and 6.

In further examples, the Heat Stability Values and Color After Milling was determined for other preferred systems utilizing other stabilizers as follows:

Example 6

| | Parts |
|---|---|
| Vinyl chloride polymer ¹ | 100 |
| Butylthiostannoic acid | 0.35 |
| 2,6-di-tert-butyl p-cresol | 0.06 |
| Dibutyltin bis lauryl mercaptide | 1.00 |

¹ Diamond 40 brand of vinyl chloride polymer.

Example 7 (control)

| | Parts |
|---|---|
| Vinyl chloride polymer ¹ | 100 |
| Dibutyltin bis lauryl mercaptide | 1.4 |

¹ Diamond 40 brand of vinyl chloride polymer.

The results of the heat stability tests are presented in Table II as follows:

TABLE II

| Example | Heat stability value in minutes | Color after milling |
|---|---|---|
| 6 | 90 | 7 |
| 7 | 60 | 4 |

From Table II, it will be apparent that the H.S.V. (Heat Stability Value) of the novel stabilized system is 50% longer than that of the control of Example 7, and the Color After Milling of the control was 4, a definite yellow color, while that of the experimental was 7, clear water-white.

Additional tests may be performed on a different vinyl chloride polymer-viz: a polymer having a specific gravity of 1.40, a Shore Durometer "D" hardness of 80, and an ultimate tensile strength of about 7,000 p.s.i. sold under the trademark Diamond–450. The formulations may be prepared as hereinafter set forth and the H.S.V. and Color After Milling determined as supra.

Example 8 (control)

| | Parts |
|---|---|
| Vinyl chloride polymer | 100 |
| Di-n-octyltin bis iso-octyl mercaptoacetate | 1.44 |
| Heat stability value minutes | 45 |
| Color after milling | 7 |

Example 9 (control)

| | Parts |
|---|---|
| Vinyl chloride polymer | 100 |
| 2,6-di-tert-butyl p-cresol | 1.46 |
| Di-n-octyltin bis iso-octyl mercaptoacetate | 0.74 |
| Heat stability value minutes | 30 |
| Color after milling | 6 |

Example 10 (control)

| | Parts |
|---|---|
| Vinyl chloride polymer | 100 |
| Butyl thiostannoic acid | 1.20 |
| Heat stability value minutes | 30 |
| Color after milling | 6 |

Example 11 (control)

| | Parts |
|---|---|
| Vinyl chloride polymer | 100 |
| Butyl thiostannoic acid | 0.35 |
| 2,6-di-tert-butyl p-cresol | 1.46 |
| Heat stability value minutes | 30 |
| Color after milling | 6 |

Example 12 (experimental)

| | Parts |
|---|---|
| Vinyl chloride polymer | 100 |
| Butyl thiostannoic acid | 0.35 |
| 2,6-di-tert-butyl p-cresol | 0.06 |
| Di-n-octyltin bis iso-octyl mercaptoacetate | 1.00 |
| Heat stability value minutes | 90 |
| Color after milling | 7 |

It will be apparent from a comparison of control Examples 8–11 with experimental Example 12 that the heat stability value (H.S.V.) of the novel product of this invention may be 2–3 times that of the controls. The H.S.V. of this novel composition may be, for example, three times as long as that for (Example 11) a composition containing only some of the ingredients.

Furthermore, the color after milling of the novel product is 7, which (when considered together with the 90 minute H.S.V. value) is outstandingly superior to any of the values for the controls.

In further examples, the outstanding properties of these compositions may be observed.

Example 13 (control)

| | Parts |
|---|---|
| Vinyl chloride polymer | 100 |
| Dimethyltin bis iso-octyl mercaptoacetate | 2.2 |
| Heat stability value _____minutes | 75 |
| Color after milling | 6 |

Example 14 (experimental)

| | |
|---|---|
| Vinyl chloride polymer | 100 |
| Butyl thiostannoic acid | 0.59 |
| 2,6-di-tert-butyl p-cresol | 0.13 |
| Dimethyltin bis iso-octyl mercaptoacetate | 1.47 |
| Heat stability value _____minutes | 90+ |
| Color after milling | 7 |

From a comparison of Examples 13 and 14, it will be apparent that the H.S.V. of the experimental is greater than 20% better than that of the control and that the color of the experimental was superior to that of the control.

Accordingly it will be apparent to those skilled-in-the-art that practice of the novel process of this invention permits attainment of polymeric resins characterized by extremely high degree of heat stability.

Illustrative other examples of preferred stabilizer systems which may fall within the scope of the invention and permit attainment of properties familiar to those hereinbefore set forth (when admixed with 100 parts of resin) may include the following:

A

| | Parts |
|---|---|
| Vinyl chloride homopolymer | 100 |
| Butyl thiostannoic acid | 0.3 |
| 2,6-di-tert-butyl-p-cresol | 0.06 |
| Dibutyltin bis iso-octyl mercaptoacetate | 0.80 |

B

| | |
|---|---|
| Vinyl chloride-vinyl acetate copolymer | 100 |
| Butyl thiostannoic acid | 0.31 |
| 2,4,6-tri-isopropylphenol | 0.04 |
| Di-n-octyltin bis iso-octyl mercaptoacetate | 0.85 |

C

| | |
|---|---|
| Vinylidene chloride homopolymer | 100 |
| Butyl thiostannoic acid | 0.51 |
| 2,6-di-isobutyl-4-ethyl-phenol | 0.13 |
| Dimethyltin bis iso-octyl mercaptoacetate | 1.47 |

D

| | |
|---|---|
| Vinyl chloride homopolymer | 100 |
| Butyl thiostannoic acid | 0.42 |
| 2,6-di-isoamyl-4-n-propyl phenol | 0.12 |
| Di-n-octyltin bis iso-octyl mercaptoacetate | 0.87 |

E

| | |
|---|---|
| Vinyl chloride homopolymer | 100 |
| Octyl thiostannoic acid | 0.29 |
| 2,4,6-tri-tert-butylphenol | 0.20 |
| Di-n-octyltin bis iso-octyl mercaptoacetate | 1.0 |

F

| | |
|---|---|
| Vinyl chloride homopolymer | 100 |
| Cyclohexyl thiostannoic acid | 0.36 |
| 2,6-di-tert-butyl-4-nonylphenol | 0.29 |
| Di-n-octyl tin bis iso-octyl mercaptoacetate | 0.87 |

Although this inevntion has been illustrated by reference to specific examples, changes therein which clearly fall within the scope of theh invention will be apparent to those skilled-in-the-art. It is therefore, to be limited solely by the scope of the appended claims.

What is claimed is:

1. A novel halogen-containing polymer stabilized against the deteriorative effect of heat comprising a halogen-containing resin selected from the group consisting of homopolymers of vinyl chloride or vinylidene chloride, and copolymers of vinyl chloride and vinylidene chloride with other ethylenically unsaturated monomers and a stabilizing amount of: a first stabilizer having the formula $(RSnX_{1.5})_n$ wherein R is selected from the group consisting of alkyl having 1 to 20 carbon atoms, aryl, alkaryl, aralkyl, and cycloalkyl, and X is selected from the group consisting of oxygen and sulfur and mixtures of 1–10 parts of oxygen with 10–1 parts of sulfur and $n$ is an integer 2–1000; a second stabilizer having the formula

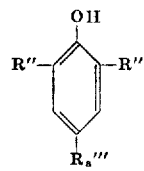

wherein R″ is a branched alkyl containing less than 10 carbon atoms, R‴ is an alkyl containing less than 10 carbon atoms, and $a$ is a number 0–1; and a third stabilizer $R'_a Sn(SR'')_{4-a}$ wherein R′ is a hydrocarbon radical selected from the group consisting of alkyl, cycloalkyl, aralkyl, alkaryl, and aryl, R″ is a residue of a carboxylic acid, a residue of a carboxylic acid ester, or a radical selected from the same group as R′, and $a$ is an integer 1–3.

2. A novel halogen-containing polymer stabilized against the deteriorative effect of heat as claimed in claim 1 wherein said first stabilizer is butyl thiostannoic acid $(C_4H_9SnS_{1.5})_n$ wherein $n$ is 2–1000.

3. A novel halogen-containing polymer stabilized against the deteriorative effect of heat as claimed in claim 1 wherein said second stabilizer is 2,6-di-tert-butyl-p-cresol.

4. A novel halogen-containing polymer stabilized against the deteriorative effect of heat as claimed in claim 1 wherein said third stabilizer is dibutyltin bis iso-octyl mercaptoacetate.

5. A novel stabilizing composition for stabilizing a halogen-containing polymer selected from the group consisting of homopolymers of vinyl chloride or vinylidene chloride, and copolymers of vinyl chloride and vinylidene chloride with other ethylenically unsaturated monomers against the deteriorative effect of heat which comprises a first stabilizer having the formula $(RSnX_{1.5})_n$ wherein R is selected from the group consisting of alkyl having 1 to 20 carbon atoms, aryl, alkaryl, aralkyl, and cycloalkyl, and X is selected from the group consisting of oxygen and sulfur and mixtures of 1–10 parts of oxygen with 10–1 parts of sulfur and $n$ is an integer 2–1000; a second stabilizer having the formula

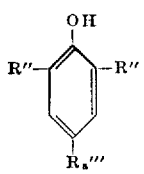

wherein R″ is a branched alkyl containing less than 10 carbon atoms, R‴ is an alkyl containing less than 10 carbon atoms, and $a$ is a number 0–1; and a third stabilizer $R'_a(SnSR'')_{4-a}$ wherein R′ is a hydrocarbon radical selected from the group consisting of alkyl, cycloalkyl, aralkyl, alkaryl, and aryl, R″ is a residue of a carboxylic acid, a residue of a carboxylic acid ester, or a radical selected from the same group as R′, and $a$ is an integer 1–3.

6. A novel stabilizing composition for stabilizing a halogen-containing polymer against the deteriorative effect of heat as claimed in claim 5 wherein said first stabilizer is butyl thiostannoic acid $(C_4H_9SnS_{1.5})_n$ wherein $n$ is 2–1000.

7. A novel stabilizing composition for stabilizing a halogen-containing polymer against the deteriorative effect of heat as claimed in claim 5 wherein said second stabilizer is 2,6-di-tert-butyl-p-cresol.

8. A novel stabilizing composition for stabilizing a halogen-containing polymer against the deteriorative effect of heat as claimed in claim 5 wherein said third stabilizer is dibutyltin bis iso-octyl mercaptoacetate.

9. A novel stabilizing composition for stabilizing a halogen-containing polymer selected from the group consisting of homopolymers of vinyl chloride or vinylidene chloride, and copolymers of vinyl chloride and vinylidene chloride with other ethylenically unsaturated monomers against the deteriorative effect of heat which comprises 0.1–10 parts of a first stabilizer having the formula $(RSnX_{1.5})_n$ wherein R is selected from the group consisting of alkyl having 1 to 20 carbon atoms, aryl, alkaryl, aralkyl, and cycloalkyl, and X is selected from the group consisting of oxygen and sulfur and mixtures of 1–10 parts of oxygen with 10–1 parts of sulfur and $n$ is an integer 2–1000; 0.01–2 parts of a second stabilizer having the formula

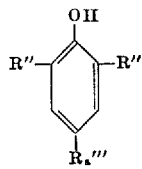

wherein R″ is a branched alkyl containing less than 10 carbon atoms, R‴ is an alkyl containing less than 10 carbon atoms, and $a$ is a number 0–1; and a third stabilizer $R'_a(SnSR'')_{4-a}$ wherein R' is a hydrocarbon radical selected from the group consisting of alkyl, cycloalkyl, aralkyl, alkaryl, and aryl, R″ is a residue of a carboxylic acid, a residue of a carboxylic acid ester, or a radical selected from the same group as R', and $a$ is an integer 1–3.

References Cited

UNITED STATES PATENTS

| | | | |
|---|---|---|---|
| 2,789,102 | 4/1957 | Weinker | 260—45.75 |
| 2,809,956 | 10/1957 | Mack | 260—45.75 |
| 2,914,506 | 11/1959 | Mack | 260—45.75 |
| 2,919,259 | 12/1959 | Naylor | 260—45.75 |
| 3,021,302 | 2/1962 | Frey | 260—45.75 |

DONALD E. CZAJA, *Primary Examiner.*

V. P. HOKE, *Assistant Examiner.*

U.S. Cl. X.R.

252—400; 260—45.95